United States Patent
Kellner

(10) Patent No.: US 12,326,499 B2
(45) Date of Patent: Jun. 10, 2025

(54) METHOD FOR DETECTING MOVING OBJECTS IN THE SURROUNDINGS OF A VEHICLE, AND MOTOR VEHICLE

(71) Applicant: Bayerische Motoren Werke Aktiengesellschaft, Munich (DE)

(72) Inventor: Dominik Kellner, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 255 days.

(21) Appl. No.: 17/802,057

(22) PCT Filed: Jan. 25, 2021

(86) PCT No.: PCT/EP2021/051605
§ 371 (c)(1),
(2) Date: Aug. 24, 2022

(87) PCT Pub. No.: WO2021/170321
PCT Pub. Date: Sep. 2, 2021

(65) Prior Publication Data
US 2023/0094836 A1 Mar. 30, 2023

(30) Foreign Application Priority Data
Feb. 27, 2020 (DE) ............. 10 2020 105 192.1

(51) Int. Cl.
*G01S 13/86* (2006.01)
*G01S 13/931* (2020.01)
(Continued)

(52) U.S. Cl.
CPC .......... *G01S 13/867* (2013.01); *G01S 13/931* (2013.01); *G06V 10/764* (2022.01); *G06V 20/58* (2022.01)

(58) Field of Classification Search
CPC ..... G01S 13/867; G01S 13/931; G06V 20/58; G06V 10/764
See application file for complete search history.

(56) References Cited

U.S. PATENT DOCUMENTS 6,502,053 B1 * 12/2002 Hardin ............... G01S 17/58
702/143
2007/0073473 A1 3/2007 Altan et al.
(Continued)

FOREIGN PATENT DOCUMENTS

| CN | 101937078 A | 1/2011 |
|---|---|---|
| CN | 106537180 A | 3/2017 |

(Continued)

OTHER PUBLICATIONS

International Search Report (PCT/ISA/210) issued in PCT Application No. PCT/EP2021/051605 dated May 6, 2021 with English translation (four (4) pages).
(Continued)

*Primary Examiner* — William Kelleher
*Assistant Examiner* — Helena H Seraydaryan
(74) *Attorney, Agent, or Firm* — Crowell & Moring LLP

(57) ABSTRACT

Camera data and radar echoes are received from the surroundings. At least one radar echo is assigned to a delimiting frame of an object detected on the basis of a camera, the delimiting frame being generated using the camera data by comparing corresponding azimuth angles and specified distances of the radar echo and the object detected on the basis of a camera. In the event of a successful assignment, a distance which is assumed on the basis of a camera is corrected according to the distance of the respective detected object in the surroundings, said distance being determined in a radar-based manner. The respective delimiting frame
(Continued)

together with the corrected distance is then output as an object data set which indicates a successful object detection.

18 Claims, 3 Drawing Sheets

(51) Int. Cl.
  *G06V 10/764* (2022.01)
  *G06V 20/58* (2022.01)

(56) References Cited

U.S. PATENT DOCUMENTS

| | | | |
|---|---|---|---|
| 2011/0001615 A1* | 1/2011 | Kuoch | G01S 13/862 |
| | | | 382/104 |
| 2017/0205506 A1 | 7/2017 | Voorheis et al. | |
| 2018/0174461 A1 | 6/2018 | Ito et al. | |
| 2018/0259637 A1 | 9/2018 | Zeng et al. | |
| 2019/0092330 A1 | 3/2019 | Ide | |
| 2019/0293782 A1 | 9/2019 | Suryanaryana et al. | |

FOREIGN PATENT DOCUMENTS

| | | |
|---|---|---|
| CN | 107194493 A | 9/2017 |
| CN | 109102702 A | 12/2018 |
| DE | 10 2006 045 115 A1 | 4/2007 |
| DE | 11 2016 002 750 T5 | 3/2018 |
| EP | 3 229 041 A1 | 10/2017 |
| EP | 3 172 589 B1 | 3/2019 |
| EP | 3 525 000 A1 | 8/2019 |
| FR | 2 998 975 A1 | 6/2014 |
| KR | 10-2019-0060341 A | 6/2019 |
| WO | WO 2017/207727 A1 | 12/2017 |

OTHER PUBLICATIONS

German-language Written Opinion (PCT/ISA/237) issued in PCT Application No. PCT/EP2021/051605 dated May 6, 2021 (eight (8) pages).
German-language Search Report issued in German Application No. 10 2020 105 192.1 dated Nov. 9, 2020 with partial English translation (13 pages).
Chinese-language Office Action issued in Chinese Application No. 202180016307.9 dated Sep. 20, 2024 (6 pages).

\* cited by examiner

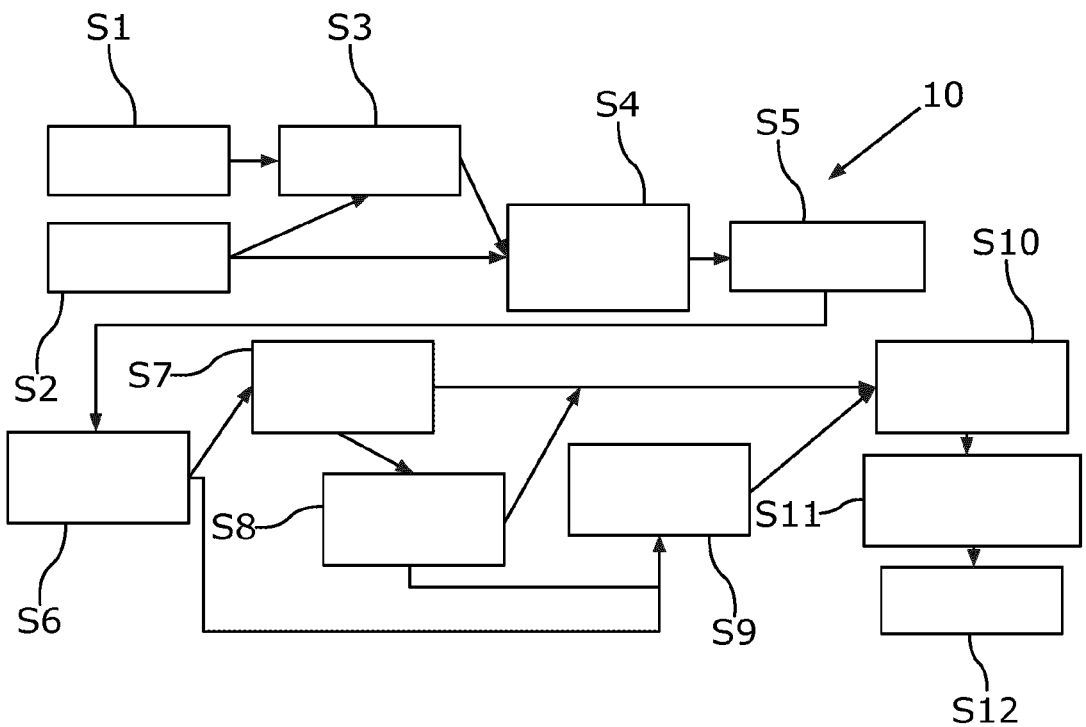
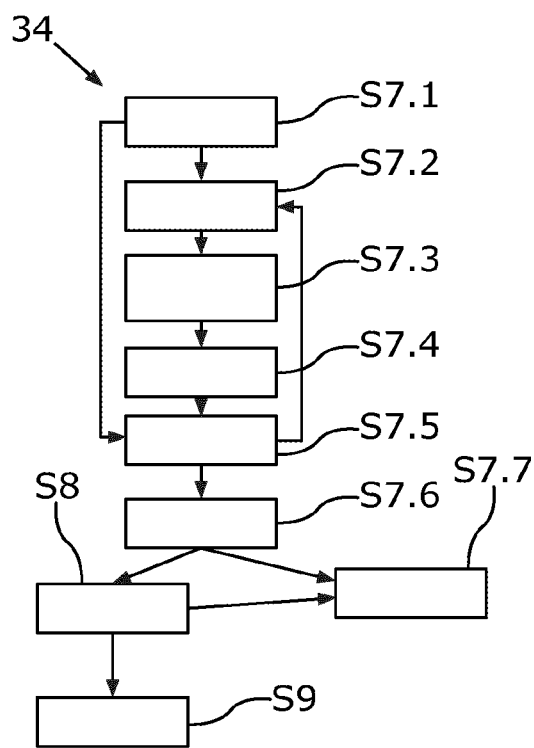
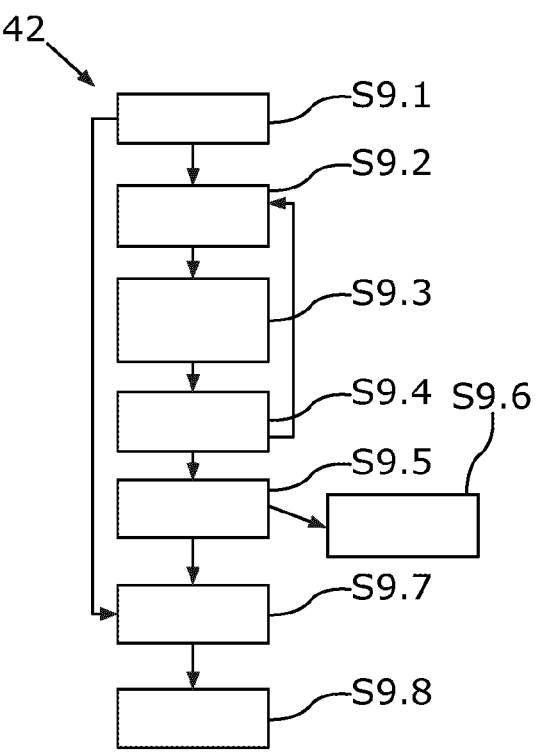
Fig.1
Fig.2
Fig.3

METHOD FOR DETECTING MOVING OBJECTS IN THE SURROUNDINGS OF A VEHICLE, AND MOTOR VEHICLE

FIELD

The present invention relates to a method for detecting moving objects in the surroundings of a vehicle and a motor vehicle configured for carrying out such a method.

BACKGROUND AND SUMMARY

In the field of vehicle technology, it is of particular importance for a variety of driver assistance systems and driving functions, in particular for highly automated or autonomous driving, to detect objects which are located in the surroundings of the respective vehicle. Such objects can be in particular other road users. The fastest and most reliable possible detection as well as accurate locating of moving objects in particular are particularly important, since hazardous situations can result due to them particularly often and particularly quickly. Accordingly, further improvements in this field are always desirable.

As one approach for this purpose, WO 2017/207 727 A1 describes improved object detection and assessment of a movement state of an object. An associated azimuth angle and a Doppler velocity component are determined for a radar detection. Furthermore, the object is recorded using a camera and an optical flow is determined from at least two camera images. A further velocity component is determined therefrom in a perpendicular direction. The complete velocity vector of the respective object is then determined from both velocity components.

As a further approach, a system for real-time control of a device is known from US 2018/0 259 637 A1. An object is optically acquired, which is located on a slope, thus in an inclined position relative to the device. A horizontal angle and a radial distance of the object from the device and a rate of change of the distance are acquired by means of a radar device. The device is then controlled based on a 3D position matrix and a 3D rate of change matrix, which were determined based on the visual data and the radar data.

As a further approach, an object detection system is described in EP 3 229 041 A1, which comprises a radar sensor and a camera. A radar signal is to indicate a distance and direction of an object in the surroundings of a vehicle. An image recorded by means of the camera is to overlap a field of view of the radar signal. A distance map for the image is then to be determined based on the distance and direction of the object. A detection zone is defined in the image based thereon. Exclusively this detection zone of the image is then processed to identify the object.

The object of the present invention is to enable improved detection of moving objects in the surroundings of a vehicle. This object is achieved according to the invention by the subjects of the independent claims. Advantageous embodiments and refinements of the present invention are specified in the dependent claims, in the description, and in the figures.

The method according to the invention is used to detect objects from a motor vehicle which are moving in the surroundings of the motor vehicle. The surroundings can be defined in this case by a detection range or sensor range of at least one camera and at least one radar unit of the motor vehicle. In the method, camera data of the surroundings are recorded. The camera data can be recorded by means of the camera of the motor vehicle. The recording of the camera data can also comprise or mean the acquisition or reception thereof from the camera or via a corresponding data interface by a data processing unit configured for carrying out the method. The camera data thus depict the surroundings of the motor vehicle. Furthermore, in the method according to the invention, radar echoes are recorded from the surroundings of the motor vehicle. The radar echoes can be recorded, thus measured, by means of the radar unit. The recording of the radar echoes can also mean or comprise the acquisition or reception thereof from the radar unit or via a corresponding data interface by the data processing unit. In particular these are radar echoes which arise due to reflection of at least one radar pulse emitted from the radar unit into the surroundings from objects located in the surroundings back to the radar unit. The radar echoes thus represent objects in the surroundings of the motor vehicle, thus also depict the surroundings of the motor vehicle in this meaning.

In one method step of the method according to the invention, objects depicted therein are recognized on the basis of the camera data, wherein for a recognized object, an azimuth angle range or horizontal angle range occupied by this object from the viewpoint of the motor vehicle is determined in each case and a delimiting frame (technically: bounding box) enclosing the respective object having an assumed or estimated distance to the motor vehicle is generated. Image processing or object recognition means or algorithms known per se can be used for recognizing the objects in the camera data, thus in particular in a respective camera image. Therefore, for example, objects can be detected on the basis of edges, contours, coherent surfaces, or the like. The azimuth angle range is defined here in a plane which can extend, for example, in parallel to a bottom of the motor vehicle. In particular, this can be a plane, which is possibly idealized or smoothed, of an underlying surface traveled by the motor vehicle, thus, for example, a roadway surface or the like. The azimuth angle range can be defined here in relation to a predefined direction. For example, an imaginary direction going out forward or in the travel direction from the motor vehicle, in particular from the camera, can be predefined as a reference or zero direction (also referred to as the x direction).

The assumed or estimated distance of the respective object or the respective delimiting frame can be determined or defined, for example, based on predefined assumptions with respect to a width or length of different objects. Optical properties of the camera can be taken into consideration, which determine, for example, how large an object of a specific actual size appears in a specific distance to the camera in the camera data or in the respective camera image. Estimated or predefined relative size relationships between different objects depicted in the camera data can also be taken into consideration here. For example, if a passenger vehicle appears as large as a building in the camera data or, for example, a pedestrian also appears as wide as a passenger vehicle, it can thus be presumed in each case that these objects are located at different distances to the camera and thus to the motor vehicle. This in turn permits, possibly in consideration of predefined typical sizes for such objects, an inference about the approximate distance of the respective object from the motor vehicle. Features of the surroundings depicted and detected, for example, between the respective object and the camera in the camera data, for example, a roadway width or traffic lane markings or the like, can also be used to estimate the distance.

The respective delimiting frame can particularly preferably be projected based on the assumed distance in a 2D space, in particular in the plane also used for the azimuth angle range. A predefined coordinate system can be used for this plane, wherein the motor vehicle or the camera or a surroundings sensor system of the motor vehicle comprising the camera and the radar unit can be arranged, for example, in a zero point of the coordinate system. In particular, the predefined coordinate system can be a camera coordinate system, thus that coordinate system in which the camera data are acquired or processed or managed, in which the delimiting frames are thus also located, for example.

In a further method step of the method according to the invention, an associated Doppler velocity with respect to a current position of the motor vehicle is determined for the radar echoes. The Doppler velocity in this meaning is a radial velocity of the respective object which generates the respective radar echo that is corrected or compensated by an intrinsic velocity of the motor vehicle, thus reduced or increased depending on the sign. The radar unit or the motor vehicle or its current position can thus be viewed as the center point of a circle, on the circumferential line of which the respective object is arranged. The Doppler velocity then specifies a velocity component of the object along a radius of this circle-either toward the center point or away from the center point-independently of an intrinsic movement of the motor vehicle, thus in a or in relation to a world-fixed coordinate system. Radar echoes for which a non-negligible Doppler velocity, thus not equal to zero, was determined here are referred to here as moving radar echoes. At least for the ascertained moving radar echoes, an associated distance from the motor vehicle and an associated azimuth angle are determined. These distances and azimuth angles are thus determined here, in particular only, on the basis of the measured radar echoes or corresponding radar data, thus on the basis of measurement data of the radar unit. A 2D position results for the respective radar echo on the basis of the respective determined distance and the respective azimuth angle. This 2D position, thus effectively the respective radar echo or an object causing the respective radar echo, can then also be projected or plotted in the mentioned 2D space or the mentioned plane, thus in a coordinate system also used for the camera data. The radar echoes can also be projected or transferred into the respective camera image. The radar echoes or the radar echoes in combination with the determined distances and azimuth angles can thus be understood as a point distribution or point cloud in the corresponding 2D space or coordinate system. The radar-based determined azimuth angles can in principle have a greater uncertainty or measurement inaccuracy. To take this into consideration hereinafter, the camera-based determined azimuth angle range can preferably be expanded or enlarged on both sides or in both directions by a tolerance range. This tolerance range can correspond to the predefined or assumed uncertainty or measurement accuracy of the radar-based determination of the azimuth angle. The tolerance range can particularly preferably be determined as a multiple of the standard deviation, in particular as the 3 range, so that approximately 99.7% of all corresponding measured values are thus acquired.

In a further method step of the method according to the invention, an assignment is carried out between at least one of the moving radar echoes and at least one of the delimiting frames. For this purpose, the respective azimuth angle is compared to the determined azimuth angle ranges of the delimiting frames, which are used in particular as a reference or true value, and the respective radar-based determined distance, which is used in particular as a reference or true value, is compared—directly or indirectly—to the camera-based assumed distances. Preferably, the comparisons of the distance can be carried out here based on respective scaling errors, which will be explained in more detail hereinafter. The comparison can take place in particular on a percentage basis and not in absolute terms, thus, for example, not in meters. For example, a quotient of the respective radar-based determined distance and the respective camera-based assumed distance can thus be formed and assessed, thus compared, for example, to a predefined reference value or threshold value.

Carrying out the assignment can mean in particular in terms of the present invention that these comparisons are carried out, wherein the assignment can be successful if the comparisons are successful, thus meet a respective predefined criterion, for example, and can fail or be discarded if the comparisons fail, thus, for example, do not meet at least one predefined criterion. A comparison can be successful, for example, if the respective values or data matched or compared to one another have a predefined similarity to one another, thus differ from one another, for example, by at most a predefined value or absolute value, or the like. Further details on the comparison are explained in more detail hereinafter. Ultimately, it is thus determined here whether a combination made up of a delimiting frame and at least one moving radar echo that matches with respect to the respective properties exists or can be found. This could be the case, for example, if one or more of the moving radar echoes were generated and reflected directly to the radar unit by that object which is enclosed or represented by the respective delimiting frame. In different situations or embodiments of the present invention, only one radar echo or multiple radar echoes can be assigned to a delimiting frame here. An assignment of a specific radar echo to different delimiting frames, thus a double assignment of a radar echo, is particularly preferably prevented automatically here, for example, by a corresponding query or by removing successfully assigned radar echoes from a set of the radar echoes still available for assignment. If an assignment of a radar echo to different delimiting frames would be possible or plausible on the basis of the mentioned data or properties, a respective probability can be determined that the radar echo is associated with the one or the other delimiting frame or object. The assignment can then be carried out using the greater probability. The determination of such probabilities is explained in more detail hereinafter.

In a further method step of the method according to the invention, for the delimiting frames, to each of which at least one of the moving radar echoes was successfully assigned, the respective assumed distance is corrected according to the radar-based determined distance of the respective assigned radar echoes. The assumed distance can be replaced, for example, by the distance of an assigned radar echo. If multiple radar echoes were assigned to one delimiting frame, the assumed distance of this delimiting frame can be replaced, for example, by a mean value of the distances determined for the assigned radar echoes. A predefined or estimated measurement error or a measurement accuracy of the radar-based determined distances, an inaccuracy or uncertainty of the assumed distance, and/or the like can also be taken into consideration in the correction of the assumed distance, for example. The respective delimiting frame can be shifted in the mentioned 2D space or in the mentioned plane according to the radar-based determined distance or distance of the object thus detected from the motor vehicle.

The delimiting frames having the respective corrected distance are then output, provided, or used further as an object data set, which indicates a successful object detection. The object data set can then serve or be used, for example, as the foundation for further calculations, for example, as the basis or input data for a Kalman filter, for driving functions or control processes of the motor vehicle, and/or the like. The object data set can be supplemented by further data or properties, for example, to characterize the respective object more accurately. For example, the respective Doppler velocity, an orientation of the respective object, its yaw rate, its model or type, one or more probabilities or confidences for the assignment and/or individual determined values or properties and/or the like can be added to the object data set. For example, the object data set can be used for tracking, thus keeping track of the respective object or for filling a dynamic map grid or raster and/or the like.

The detection of the object in the meaning of the present invention can thus mean or comprise that it is recognized that there is an object in the surroundings, this object is located, i.e., a position relative to the motor vehicle is determined, and possibly a relative movement between the object and the motor vehicle, in particular a movement direction of the object in the radial direction in relation to the motor vehicle is determined. For this purpose, in the present case camera data and radar data are combined or fused with one another. These two types of sensors or data advantageously have different strengths and weaknesses with respect to the object detection and thus advantageously supplement one another, to enable particularly accurate and reliable object detection. An azimuth angle range, in which the object is located, can thus advantageously be determined particularly accurately by means of the camera or on the basis of the camera data and the respective object can be classified, thus, for example, a type or a model of the respective object can be determined. In contrast, the distance of the respective object and its Doppler velocity can each advantageously be determined particularly accurately with respect to the radar unit or the motor vehicle equipped therewith by means of the radar unit or on the basis of the radar data or radar echoes. One particular advantage of the present method is that raw data can be combined or fused with one another here. The radar echoes, possibly including the associated Doppler velocity and distance and the associated azimuth angle, thus do not represent complete object detection in the conventional meaning taken as such, since, for example, the radar data taken alone cannot be processed enough that complete objects are identified and corresponding delimiting frames are generated based thereon. Rather, in the present invention, the fusion or combination of the camera data with the radar data takes place at an earlier point in time in a data processing chain, since the camera data or delimiting frames generated therein or based thereon are associated here with raw radar data, namely individual radar echoes, before the object detection is completed. Objects can thus be detected by means of the present invention with improved reliability and accuracy and moreover faster in comparison to conventional detection methods and with less data processing effort. It is particularly advantageous here that an object detection according to the method according to the invention is possible based on a single radar measurement cycle and a single camera image. A single camera image can be a single recorded frame here. A single radar measurement cycle can be, for example, a one-time emission of a radar pulse chain, thus a one-time sampling or scanning of the surroundings or an acquisition region or field of view of the radar unit, and the recording of radar echoes resulting therefrom. Depending on the design or embodiment of the radar unit, for example, 1024 signal ramps, possibly of different frequencies, can be emitted in one radar measurement cycle. One such measurement cycle can be carried out, for example, every 20 ms. Depending on the design of the camera, a camera image can be recorded, for example, every 50 ms or, for example, synchronized with the radar measurement cycles or radar pulses.

By way of the present invention, not only can particularly accurate positions of the objects in the surroundings of the motor vehicle be advantageously determined, but rather in addition it can be ascertained particularly accurately whether the respective object is relevant or highly relevant, thus independently moves relative to the motor vehicle, in particular toward the motor vehicle, and which type of object it is. A significant reduction of an initialization time and a combined measurement or an object detection based on two different types of sensors can thus advantageously be achieved by the present invention in comparison to conventional detection methods. By way of the combination proposed here of camera data and radar data, a particularly high confidence level of resulting object detections can advantageously be achieved, since a successful object detection is based on different measurement principles and measuring units. In comparison to a solely radar-based object detection, for example, it can be identified particularly reliably that a determined radar echo originates from a relevant object and is not, for example, clutter, thus represents interference data. All possibly following processing or processes can thus advantageously be carried out with increased reliability and confidence, so that ultimately, for example, the motor vehicle can be operated more reliably and safely. The method according to the invention can preferably be applied for automated driving functions in urban, thus city surroundings, but also in extra-urban regions.

In one advantageous refinement of the present invention, the method is carried out for radar echoes of a single measurement cycle in each case. For the case in which no simultaneously recorded camera data are available for a recording time of the measurement cycle, the available camera data are interpolated or extrapolated on the recording time of the measurement cycle. An interpolation can be carried out, for example, between a camera image recorded before the radar echoes and one immediately after the end of the measurement cycle, in which the radar echoes were recorded. If a movement of at least one of the objects has taken place here during a time lying between the recording point in time of these two camera images, by interpolation between these two camera images, for example, a position and/or alignment of the respective delimiting frame can thus be shifted or adapted in such a way that it—at least presumably or on average—more accurately corresponds to the actual position or orientation of the respective object at the recording time of the radar echo. In contrast, if neither a camera image recorded during the recording time of the radar echo, thus during the measurement cycle, nor a camera image recorded thereafter is available, the position and/or orientation of the respective object can thus be extrapolated from one or more camera images recorded before the measurement cycle. An improvement in comparison to the use of non-interpolated or non-extrapolated camera data can be achieved here with sufficiently high reliability on the basis of the typically used recording frequencies for the camera data and measurement cycles and the real occurring velocities of objects in road traffic. The interpolation or extrapolation of the camera data on the recording time of the measurement cycle can be carried out, for example, on the basis of timestamps of the respective data, which can be automatically assigned or set during the respective recording of the data. A more accurate and reliable assignment between the respective radar echoes and the delimiting frame or frames or the corresponding objects can advantageously be determined by the interpolation or extrapolation of the camera data. A linear interpolation or extrapolation can particularly preferably be applied here, which can advantageously be carried out with particularly low computing effort and thus particularly fast with sufficient accuracy and reliability at the same time.

In a further advantageous embodiment of the present invention, for the comparison of the distances, the radar echoes and the delimiting frames are embedded in a predefined or common coordinate system, in particular in the mentioned camera coordinate system, the center point or zero point of which corresponds to the position of the camera. A respective scaling error or scaling factor is determined therein at least for the moving radar echoes, which indicates a distance of the respective radar echo to the respective delimiting frame in the predefined coordinate system in the radial direction with respect to the current position of the motor vehicle, in particular with respect to the current position of the camera. The direction of the Doppler velocity of the respective object, in contrast, can be determined in a radar coordinate system, the center point or zero point of which corresponds to the respective current position of the radar unit or its radar sensors, and does not have to be transformed or transferred into the camera coordinate system.

The respective determined scaling error or scaling factor is then taken into consideration in that for a successful assignment of the respective radar echo to the respective delimiting frame, it has to be less than a predefined threshold value or has to be in a predefined range or interval. A minimum scaling error and a maximum scaling error can be calculated here for the respective radar echo. The minimum scaling error indicates the distance of the respective radar echo or the position of the respective radar echo in the predefined coordinate system to a closest point or edge of the respective delimiting frame. Accordingly, the maximum scaling error indicates the distance of the respective radar echo or its position to the most remote point or edge of the delimiting frame. These distances can be determined here in particular along a radius line extending from the respective radar echo to the motor vehicle, at least in the cases in which such a radius line touches or intersects the delimiting frame. If the respective radius line extends adjacent to the respective delimiting frame, an auxiliary line extending perpendicularly to the respective radius line, for example, which intersects the delimiting frame, can thus be used. The minimum scaling error then results as the distance between the radar echo and the closest point of intersection of the auxiliary line with the radius line, extending through which the auxiliary line intersects the delimiting frame. Similarly, the maximum scaling error can be used as the distance between the radar echo and the point of intersection of the radius line and the auxiliary line, which is farthest away from the radar echo and still results in touching or intersecting of the delimiting frame by the auxiliary line. Additionally or alternatively, an average scaling error can also be calculated, which accordingly consists, for example, of the distance of the respective radar echo to a center point or a point located in the middle between the points of the delimiting frame used for the calculation of the minimum and maximum scaling error.

An error or an inaccuracy of the distance estimated on the basis of the camera data and thus the corresponding position of the delimiting frame in the predefined coordinate system can be, for example, in the range of 30%. Accordingly, for example, ±30% or, for example, ±50% can be predefined here as the threshold value for the scaling error. The scaling error can be signed here, depending on whether the delimiting frame is located between the radar echo and the motor vehicle or on a side of the radar echo facing away from the motor vehicle. For a predefined threshold value or a corresponding gating of, for example, 50%, those radar echoes can then be used or observed for the assignment, the scaling error of which is, for example, in a range from −0.5 to ±0.5. Alternative embodiments are also possible here. For example, the scaling error can be set consistently to 1 if the radar echo is located inside the delimiting frame. With a predefined threshold value of, for example, 50%, those radar echoes are taken into consideration, the scaling errors of which are in the range from 0.5 to 1.5. Radar echoes, the scaling errors of which are outside the range thus defined or above the predefined threshold value, can be discarded or not used or taken into consideration for the assignment to the respective delimiting frame. In a specific example, for an object, the camera-based assumed distance can be 60 m and the radar-based determined distance can be 40 m. A scaling factor of 60 m/40 m=1.5 thus results. The scaling error would thus be 0.5 here, for example. A range from 0.5-1.5 for the scaling factor and/or an upper threshold value of 0.5 for the scaling error can be predefined as valid values for a successful assignment, for example. In this example, the distance-based assignment would thus be successful.

The use described here of the scaling error as a criterion for the assignment of a radar echo to a specific delimiting frame advantageously enables a robust fusion of the camera and radar data in consideration of the respective strengths and weaknesses of the different underlying measurement methods.

In a further advantageous embodiment of the present invention, a probability function is predefined for the azimuth angle and/or for a scaling error, on the basis of which the respective assignment is assessed. The scaling error also indicates here, for a radar echo, its distance to the respective delimiting frame in a predefined or common coordinate system, in particular in the mentioned camera coordinate system, and can thus in particular correspond to the scaling error or scaling factor described at another point. The probability function can preferably have a central range extending constantly, from which it or the corresponding probability drops toward both sides. For example, according to the probability function for the scaling error, an assignment or an actual affiliation of a radar echo with a delimiting frame can be assigned a probability of 1 if the scaling error of the respective radar echo is within a predefined range or interval or below a predefined threshold value. For radar echoes having measurement scaling errors lying outside the predefined range or above the predefined threshold value, their assignment to the delimiting frame or a correctness of such an assignment, thus ultimately the actual affiliation of the radar echo with the delimiting frame or the respective object, can be assigned a probability which becomes less with increasing distance according to the predefined probability function for the scaling error. If a minimum and a maximum scaling error were calculated for a radar echo, the higher of the two corresponding probability values can thus be used, thus can be assigned to the radar echo or its assignment to the respective delimiting frame. Similarly, for example, a radar echo or its assignment to the delimiting frame can be assigned a probability or a probability value of 1 if the radar echo is located in the predefined coordinate system within an azimuth angle range covered by the respective delimiting frame. Radar echoes located outside this azimuth angle range or their assignment to the respective delimiting frame can be assigned a probability which decreases according to the probability function for the azimuth angle with increasing distance from the respective azimuth angle range of the delimiting frame.

The affiliated probabilities of the radar echoes ultimately successfully assigned to a delimiting frame or an overall probability value calculated therefrom—for example, a mean value of the probabilities—can then be added as supplementary information to the respective object data set. The detection can be weighted based thereon, for example. This can advantageously enable, for example, graduated reactions or a prioritization of potential hazards or measures in the operation or the control of the motor vehicle. Thus, for example, it can be provided that a specific measure, such as an evasion maneuver or a deceleration, is only carried out when the detection of an object in a path of the motor vehicle has a predefined minimum probability.

A probability threshold value can also be predefined, for example. All radar echoes can then be assigned to the respective delimiting frame, for the assignment or affiliation thereof to the delimiting frame, a probability at least corresponding to the probability threshold value has been ascertained. In other words, gating can thus be carried out on the basis of the determined probabilities. The assignment of a radar echo to a delimiting frame can accordingly be discarded or fail if one or more probability values determined for the respective radar echo are below the predefined probability threshold value.

Additional flexibility of the method according to the invention can advantageously be provided by the determination and consideration of the probabilities proposed here and moreover a corresponding graduated or smooth consideration of those assignments or object detections can also be enabled in further data processing steps which could not be carried out unambiguously. This can ultimately contribute to more reliable and safer control of the motor vehicle.

In a further advantageous embodiment of the present invention, for the case in which at least three radar echoes were assigned to a delimiting frame, a Doppler velocity profile is determined on the basis of these at least three radar echoes, with which as many as possible of the assigned radar echoes are consistent. The distance of the respective delimiting frame is then only corrected based on the determined distances of the radar echoes consistent with the Doppler velocity profile. To determine a consistent set of radar echoes, a robust approach can preferably be used, for example, RANSAC (random sample consensus). On the basis of the assignment of multiple radar echoes to the same delimiting frame, it is possible to proceed from the hypothesis here that all of these radar echoes originate from the same extended object. Two radar echoes can then be randomly selected in each case, for example. A Doppler velocity profile is then determined for the respective selected radar echoes. This is based on the finding that the Doppler velocity can always be described as a function of the azimuth angle at least in the theoretical ideal case, thus the expected Doppler velocity as a function of the azimuth angle for radar echoes of an object, as a cosine function having two degrees of freedom, namely an amplitude and a phase. These two degrees of freedom or parameters can then be analytically determined on the basis of the two radar echoes, the corresponding function can thus be analytically solved. The resulting cosine function then effectively represents the respective Doppler velocity profile. It is then checked for the remaining radar echoes whether they lie on the corresponding cosine curve and are thus consistent with the respective Doppler velocity profile. A predefined deviation can be permitted, thus those radar echoes can also be classified as consistent with the respective Doppler velocity profile if they are within predefined surroundings around the respective cosine curve. Such a deviation can be given, for example, by a predefined expected error upon the determination of the Doppler velocities of the radar echoes of, for example, 0.5 m/s. It is then determined how many of the radar echoes are consistent with the respective Doppler velocity profile and thus confirm the corresponding object hypothesis. This method can be carried out for all pairs of radar echoes, a predefined number of iterations, or until reaching a predefined minimum number of consistent radar echoes.

The set of radar echoes which are consistent as such or in relation to a common Doppler velocity profile, which comprises the most radar echoes (best consensus set), can then be assigned to the respective delimiting frame. This assignment can actually be carried out or be successful when the set of radar echoes which have a consistent Doppler curve corresponds to at least a predefined minimum number. The minimum number of radar echoes can be 3, for example, since a cosine curve can always be found in any case for two radar echoes, which extends in a Doppler velocity azimuth angle coordinate system precisely through these two radar echoes. If the data are subject to a certain level of noise, five can be predefined as a minimum number, for example, to achieve a more reliable result. If this minimum number of consistent radar echoes is not reached by a set or a combination of radar echoes, the assignment of the radar echoes to the delimiting frame can be discarded or fail. It is then possible to continue with a single echo approach for the individual radar echoes, for example, which is described hereinafter.

In the formation described here of the set of consistent radar echoes, their minimum and maximum or average scaling error or scaling factor can particularly preferably also be taken into consideration. The set can then only contain those radar echoes which are consistent with a common Doppler velocity profile and the scaling error of which enables a successful assignment to the respective delimiting frame in the described manner and/or which at least essentially have the same scaling error. For example, a set of consistent radar echoes can then only contain those radar echoes, the scaling errors of which differ at most by a predefined value, for example, by at most 10% or at most 5% from one another.

It can advantageously be ensured particularly reliably by the measures described here that only those radar echoes are assigned to the respective delimiting frame or the corresponding object which actually originate from the same real object. This can ultimately advantageously contribute to particularly reliable object detection and improved and more consistent tracking of the respective object.

To actually reliably detect only moving, thus particularly relevant objects, moreover a minimum Doppler velocity can be predefined here as a threshold value for taking into consideration a radar echo. The radar echoes can thus be filtered according to this threshold value, so that only those radar echoes are taken into consideration or are only considered here for the formation of the set of consistent radar echoes or for the assignment to the respective delimiting frame for which a Doppler velocity lying above the predefined threshold value was determined. A minimum Doppler velocity of 0.5 m/s can be predefined as such a threshold value, for example.

Multiple radar units or multiple radar sensors can particularly preferably be used to acquire radar echoes from the surroundings of the motor vehicle. In the case of a linear movement of the object, radar echoes or corresponding results or data of different radar units or radar sensors can then be consistent with the same Doppler velocity profile. An even more accurate and reliable assignment can thus be achieved and, for example, a number of radar echoes in the ultimately determined set of consistent radar echoes can be increased.

In one advantageous refinement of the present invention, an orientation of the associated object is estimated on the basis of the radar echoes. This estimated orientation is compared to an orientation of the respective delimiting frame. The assignment is then assessed on the basis of a deviation ascertained here of these orientations from one another and/or is only carried out or retained if the deviation is less than a predefined threshold value. The orientation can be determined here in each iteration, thus for each determined set of radar echoes consistent with a Doppler velocity profile. The orientation or its deviation from the orientation of the delimiting frame can then be used as an additional criterion for whether the respective set of radar echoes is actually assigned to the delimiting frame or is classified as consistent with the object. The orientation can also, for example, only be determined for the best set of radar echoes determined at least based on the Doppler velocity profile. The latter can advantageously save computing effort. If the deviation of the orientations from one another is greater than the predefined threshold value, the assignment can be discarded or fail. It is then possible to continue for the individual radar echoes with a single echo approach, which is described hereinafter. The deviation of the orientations from one another can also be used as the foundation for assessing the assignment, for example, by specifying a corresponding assignment or affiliation probability of the radar echoes to the delimiting frame.

The orientation can be determined on the basis of the radar echoes, for example, as a best-fit straight line of the positions of the radar echoes plotted in a coordinate system, possibly in consideration of their Doppler velocity or a movement direction determined based thereon. A different or more complex model can also be specified for determining the orientation, which can take into consideration, for example, a type or classification of the respective object ascertained on the basis of the camera data and a shape predefined for this purpose and/or more of the like.

Due to the consideration proposed here of the orientation as an additional criterion, the reliability of the assignment can advantageously be further improved and therefore ultimately a more reliable and safe operation of the motor vehicle can be enabled.

In one advantageous refinement of the present invention, the orientation of the respective delimiting frame—and thus the orientation of the respective object enclosed thereby—is determined. On the basis of the radar echoes, in particular the radar echoes consistent with a common Doppler velocity profile—as described—a radar-based orientation and movement velocity of the object in the direction of the radar-based determined orientation is estimated. The radar-based determined orientation and movement velocity can be or become combined to form a radar-based determined movement vector of the respective object or the respective suspected object. The radar-based determined orientation is then compared to the orientation of the delimiting frame. In the event of a deviation of the orientations from one another lying above a predefined threshold value, it is checked whether the respective data or values or results are consistent with a yawing object, thus an object rotating around a vertical axis perpendicular to the azimuth angle plane. A predefined, in particular velocity-dependent yaw rate and/or a predefined velocity is used as a plausible reference here. The object represented by the respective delimiting frame can particularly preferably be classified here on the basis of the camera data, in particular identified with respect to its type or its model, wherein different plausible references or reference values for the yaw rate can be predefined for different classes, types, or models of objects. Such a classification of the object can also be used as the foundation for estimating its velocity or as the foundation for a plausible velocity range. For example, a table or database having plausible value ranges and/or plausible combinations of values or value ranges can be predefined for different types or models of objects.

If, for example, a vehicle has a yaw rate not equal to zero, thus rotates or drives through a curve, for example, a Doppler velocity profile of associated radar echoes of this object can furthermore be described as a cosine or cosine function having two degrees of freedom. The yaw rate or the yawing or rotating of the object can, however, influence or distort or shift the radar-based determined orientation and/or movement velocity, thus the movement vector of the object. It is typically not possible here to analytically solve a corresponding problem having three degrees of freedom, namely the velocity, the orientation, and the yaw rate, on the basis of the radar echoes or the radar data. It is accordingly proposed here that the yaw rate be estimated based on the orientation of the delimiting frame and the estimated or determined velocity. On the basis of the predefined plausible values or one or more predefined threshold values, it can be checked whether the yaw rate and/or velocity thus ascertained or their combination are realistic. For example, a plausible yaw rate for a motor vehicle can be less than 60° per second. A plausible yaw rate can be lower the greater the velocity of the vehicle is. A further possibility is to accept the assignment of the radar echoes consistent with a common Doppler velocity profile to the respective delimiting frame, thus to retain it or carry it out, if the number of the radar echoes consistent with the velocity profile is greater than a predefined number threshold value. Five can be predefined as such a number threshold value, for example. Thus if-possibly in spite of a detected deviation of the radar-based determined orientation from the orientation of the respective delimiting frame-a set of radar echoes consistent with a common Doppler velocity profile contains at least five radar echoes, the assignment of these radar echoes to the delimiting frame can be retained or carried out and possibly marked or identified as originating from a yawing or turning or rotating object.

Multiple radar units or radar sensors can particularly preferably be used to acquire radar echoes from the surroundings of the motor vehicle. In such a case, the complete movement state of the respective object, thus its velocity, orientation, and yaw rate, can be estimated. This is based on the finding that up to four degrees of freedom or parameters can be determined or estimated using two separate radar units or radar sensors. The reliability or confidence of the determined movement state can particularly preferably be determined or estimated here as the fourth parameter.

By way of the measures described here, an object detection can advantageously be reliably implemented even for yawing objects or an improved flexibility of the method according to the invention can be achieved, which enables a detection of even yawing objects.

In one advantageous refinement of the present invention, a scaling error is determined for the radar echoes, which indicates a distance of the respective radar echo to the respective delimiting frame in the radial direction with respect to the current position of the motor vehicle. This can in particular be the scaling error already mentioned at another point. Upon successful assignment of multiple consistently moving radar echoes to one delimiting frame, stationary radar echoes detected or located in a predefined spatial proximity or vicinity to these radar echoes are then analyzed. Stationary radar echoes in the meaning of the present invention are those radar echoes for which a negligible Doppler velocity, thus a Doppler velocity of zero—at least except for a predefined error—was determined. Those of the analyzed stationary radar echoes are then also assigned to the respective delimiting frame which are also consistent with the Doppler velocity profile and the scaling error of which deviates at most by a predefined absolute value from the scaling errors of the moving radar echoes already assigned to the respective delimiting frame. This procedure is based on the finding that such stationary radar echoes can also originate from the same real object as the moving radar echoes. This can be the case, for example, if an extended object at least essentially perpendicularly intersects a trajectory or movement direction of the motor vehicle. In such a case, for example, moving radar echoes can be received from a front and rear end of the crossing object and a stationary radar echo can be received from an interposed middle region of the object. By way of the assignment proposed here of such stationary radar echoes to the respective delimiting frame, the respective object can advantageously be characterized more completely or in more detail, which can advantageously enable, for example, more reliable tracking and a plausibility check of data, properties, or assumptions determined for the object on the basis of the moving radar echoes.

In a further advantageous embodiment of the present invention—in particular for the case that fewer than three moving radar echoes were assigned to a delimiting frame or such an assignment has resulted in an error, thus, for example, in discarding or failure of the assignment—a single echo approach is run through. This single echo approach is the single echo approach already mentioned at another point, which can be used if the alternative approach described for the case of a successful assignment of at least three radar echoes has failed or, for example, only one or two radar echoes were recorded. This can be the case, for example, for objects which are relatively far away from the motor vehicle and accordingly appear small. The single echo approach can also be used from the outset, which advantageously requires less computing time than the complete or graduated method, so that computing effort can advantageously be saved. For example, the determination of the Doppler velocity profile or the application or execution of the RANSAC method can be saved. Experience has shown that the single echo approach functions in particular for objects which do not have excessive variation or variance in their Doppler velocity-determined at different points of the object. Such excessive variation can occur, for example, in cross traffic or objects rotating at relatively high yaw rate.

As part of the single echo approach, an orientation of the respective delimiting frame—and thus of the object enclosed by it—is determined. Based on this orientation, a plausible Doppler velocity of the object in relation to the current position of the motor vehicle is estimated. For this purpose, for example, a plausible velocity range can be predefined for different orientations of the object or different objects. Such specifications can also be dependent on the surroundings, so that, for example, in urban surroundings different velocities can be plausible than, for example, on a freeway. Clearly, a higher Doppler velocity is plausible for a vehicle, the orientation of which is aligned radially directly onto the motor vehicle, than for a vehicle, the orientation of which is aligned transversely to the trajectory or movement direction of the motor vehicle. In specific situations or depending on the respective surroundings, for example, a Doppler velocity directed against or perpendicular to the determined orientation can also be implausible. A range of 1 m/s to 30 m/s can be predefined as plausible, for example, as an example of a moving motor vehicle in an urban environment.

Furthermore, in the single echo approach, a probability that the respective radar echo originates from the object enclosed by the respective delimiting frame is determined by comparison of the estimated Doppler velocity to the radar-based determined Doppler velocity for the respective radar echo. Only or at least the radar echo for which the highest probability was determined is then used as the basis for correcting the distance of the delimiting frame, thus assigned to the delimiting frame or associated with the corresponding object. A corresponding probability threshold value can also be predefined here, which at least has to be reached for a successful assignment or association. In this way, those moving objects can also be reliably detected, from which only fewer than three radar echoes were received.

After the determination of the radar echo having the highest probability, further radar echoes having Doppler velocities and/or scaling errors measured similarly thereto in a predefined manner can particularly preferably be ascertained and possibly also assigned to the respective delimiting frame. The described gating or the described windowing on the basis of the azimuth angle and/or on the basis of the scaling error can also be applied in the single echo approach to achieve a particularly reliable assignment of radar echoes to delimiting frames.

The single echo approach including the subsequent assignment of further similar radar echoes can particularly preferably be carried out here for multiple individual randomly selected radar echoes or all radar echoes, for example, for a predefined number of radar echoes or until reaching a predefined result or criterion. For all passes, that set of radar echoes having the highest probability and/or the greatest number of radar echoes can be used, thus assigned to the respective delimiting frame. The reliability of the assignment can thus possibly also be improved and also simplified or improved tracking of objects which are correspondingly smaller and/or correspondingly located far away from the motor vehicle can be enabled.

In a simplified variant, instead of the probability, predefined discrete values, for example, for the Doppler velocity and/or the scaling factor, can be used as the reference or comparison value. An assignment can be performed when the comparison of the estimated Doppler velocity to the radar-based determined Doppler velocity results, for example, in a deviation by at most a predefined absolute value. If the scaling factor is taken into consideration, that radar echo for which this condition is met can be used which has the smallest scaling error. In this way, calculation effort possibly can advantageously be saved and thus a faster execution of the method according to the invention can be enabled.

A further possibility is to determine all other detections, thus radar echoes, for each radar echo (similarly to RANASC), which deviate in their scaling factor or scaling error and in their Doppler velocity by less than a predefined absolute value or threshold value from the respective radar echo or its scaling factor or scaling error and its Doppler velocity. In this case, it is preferably possible to pass through all radar echoes in series or, for example, randomly selected, thus for them to be checked with respect to other radar echoes which are similar in scaling factor and the Doppler velocity. The radar echo for which accordingly the greatest number of other radar echoes, thus so-called inliers, was determined is then assigned together with other radar echoes determined for this radar echo to the respective delimiting frame.

In a further advantageous embodiment of the present invention, objects recognized on the basis of the camera data, for which a delimiting frame is or was generated, are classified based on predefined classes with respect to their type or their model. For example, objects can be classified as a vehicle, motor vehicle, passenger vehicle, truck, bicycle, pedestrian, and/or more of the like. For this purpose, for example, a conventional object recognition algorithm based on image processing can be used. Each of the predefined classes are assigned plausible radar-based determined Doppler velocity directions. The assignment of a radar echo to a delimiting frame is precluded if a Doppler velocity direction determined for the respective radar echo is different from the plausible Doppler velocity directions for the type of the object enclosed by the respective delimiting frame. In other words, so-called micro-Doppler effects can be taken into consideration here. A spatial distance of radar echoes of different Doppler velocity directions can be taken into consideration in particular here. Corresponding plausible distances can possibly also be predefined for the different classes. For example, radar echoes having different Doppler velocities or different Doppler velocity directions can typically be received for a pedestrian, since, for example, arms and legs move in different directions, in particular against an overall movement direction of the pedestrian, or can at least temporarily be stationary in spite of a movement of the pedestrian. Accordingly, radar echoes having different Doppler velocity directions can be expected for a pedestrian and are accordingly plausible. A similar effect can occur, for example, on a wheel of a motor vehicle. A spatial distance of corresponding different radar echoes is then at least essentially to correspond to a typical or plausible wheel diameter, however, to be able to be plausibly assigned to a motor vehicle. The consideration or plausibility check of the Doppler velocity directions can advantageously enable the assignment of radar echoes to delimiting frames or objects even more reliably.

In a further advantageous embodiment of the present invention, objects recognized on the basis of the camera data are also automatically classified in the described manner with respect to their type based on predefined classes. A plausible Doppler velocity range is assigned to each predefined class. The assignment of a radar echo to a delimiting frame is precluded if the Doppler velocity determined for the respective radar echo is outside the plausible Doppler velocity range for the type of the object enclosed by the respective delimiting frame. For example, pedestrians, bicyclists, and motor vehicles can be assigned different plausible velocity ranges. Accordingly, it can be implausible that a radar echo having a Doppler velocity of, for example, 20 m/s originates from a pedestrian. In other words, a plausibility check or filtering of the radar echoes coming into consideration for the assignment to a specific delimiting frame can be carried out on the basis of the determined Doppler velocities. This can advantageously also improve the reliability of the assignment of the radar echoes to the delimiting frame.

In a further advantageous embodiment of the present invention, a respective radar cross section, thus a so-called RSC value (RSC: radar cross section) is determined at least for the moving radar echoes. Objects recognized on the basis of the camera data are automatically classified in the described manner with respect to their type or their model based on predefined classes. Each predefined class is assigned a plausible radar cross section or a plausible radar cross section range. The assignment of a radar echo to a delimiting frame is precluded if the radar cross section of the respective radar echo is outside the plausible radar cross section range for the type of the object enclosed by the respective delimiting frame, thus for the class of the respective object. For example, a truck or a motor vehicle can be assigned a relatively large RSC value. If a specific object is thus classified as a truck or motor vehicle or the like, thus as an object having a relatively large RSC value, on the basis of the camera data, for the assignment of radar echoes to this object or its delimiting frame, radar echoes having a smaller radar cross section can be discarded or ignored or used or taken into consideration with a correspondingly reduced weight. Similarly, for example, for the case in which the camera recognizes a pedestrian, a correspondingly lower radar cross section can be expected. Accordingly, in the assignment of radar echoes to this pedestrian or the corresponding delimiting frame, those radar echoes can be ignored, discarded, or used or taken into consideration with reduced weight or influencing factor, the radar cross section or radar cross section value of which is larger than the expected or plausible radar cross section range for pedestrians. Such ignoring or discarding or reduced weighting of radar echoes can also be performed if such radar echoes are consistent with respect to their spatial position, thus, for example, their scaling error, with the object or other radar echoes assigned to the object and/or are consistent, for example, with the Doppler velocity profile of these other radar echoes. For example, a radar echo from a metal pillar, for example, of a traffic sign or a light signal system, can generate a radar echo having a relatively large radar cross section, which is spatially consistent with a pedestrian located next to it or their radar echo. The assignment of radar echoes to objects or delimiting frames can thus advantageously be further improved by the consideration described here of the radar cross section, in particular can be carried out with increased reliability and accuracy.

A further aspect of the present invention is a motor vehicle which has a surroundings sensor system having at least one camera for recording camera data of the surroundings of the motor vehicle and at least one radar unit or at least one radar sensor for emitting radar pulses into the surroundings and for recording resulting radar echoes from the surroundings. The motor vehicle furthermore has a data processing unit connected to the surroundings sensor system, wherein the motor vehicle according to the invention is configured to automatically carry out at least one variant of the method according to the invention. For this purpose, the data processing unit can have, for example, a data memory and a processing unit connected thereto. A predefined computer program can then be stored in the data memory, which codes or represents the method steps or sequences of the corresponding method according to the invention or corresponding control instructions and/or process steps. This computer program can then be executed by means of the processor unit, to effectuate or prompt an execution, which is in particular automatic, of the corresponding method. The motor vehicle according to the invention can be in particular the motor vehicle mentioned in conjunction with the method according to the invention. Accordingly, the motor vehicle according to the invention can have some or all of the parts, units, components, and/or properties mentioned in conjunction with the method according to the invention or can be configured for the sequences or measures mentioned therein.

The data processing unit can have a communication or data interface, via which the camera data or the radar echoes or radar data comprising them can be received. The data processing unit can also be designed as a control unit for activating the camera and/or the radar unit. Corresponding control signals can then be transmitted via the communication or data interface from the data processing unit to the camera or to the radar unit. The data processing unit or a combination of the data processing unit and the surroundings sensor system can form a driver assistance system of the motor vehicle. Such an assistance system for a motor vehicle can itself be a further independent aspect of the present invention.

Further features of the invention can result from the claims, the figures, and the description of the figures. The features and combinations of features mentioned above in the description and the features and combinations of features shown hereinafter in the description of the figures and/or solely in the figures are usable not only in the respective specified combination but also in other combinations or alone without leaving the scope of the invention.

BRIEF DESCRIPTION OF THE DRAWINGS

FIG. 1 shows an exemplary schematic flow chart for a method for detecting objects in the surroundings of a vehicle;

FIG. 2 shows an exemplary schematic flow chart of a first partial method;

FIG. 3 shows an exemplary schematic flow chart of a second partial method;

DETAILED DESCRIPTION

In the figures, identical and functionally identical elements are each provided with the same reference signs.

In vehicle technology, different types of sensors are presently used already for surroundings detection. However, it is to be observed that different sensors have different strengths and weaknesses. It has thus often occurred up to this point that data or properties of surroundings objects which can be determined only with difficulty or inaccurately by means of a specific sensor, are nonetheless determined by means of this sensor. This can relate, for example, to a solely optical distance determination or a radar-based classification or determination of an angle position. It would therefore be advantageous to carry out a data fusion of sensor data of different sensors on the earliest or lowest level possible during a data processing process, in order to obtain a combined measurement which determines or indicates all properties of the respective surroundings object with good quality, thus combines the strengths of the different types of sensors. Moreover, it would be helpful to establish a direct relation between a, for example, camera-based recognized surroundings object and radar detections. Such combined detections can then be used in downstream data processing steps or applications, for example, with a correspondingly greater weighting in comparison to detections only based on sensor data of a single sensor or a single type of sensor, for example, in a corresponding digital surroundings representation, such as a dynamic map grid or raster.

FIG. 1 shows for this purpose by way of example a schematic flow chart 10 for a corresponding method for detecting objects in the surroundings of a vehicle. This method is also to be explained hereinafter with reference to the other figures.

Figure 4:
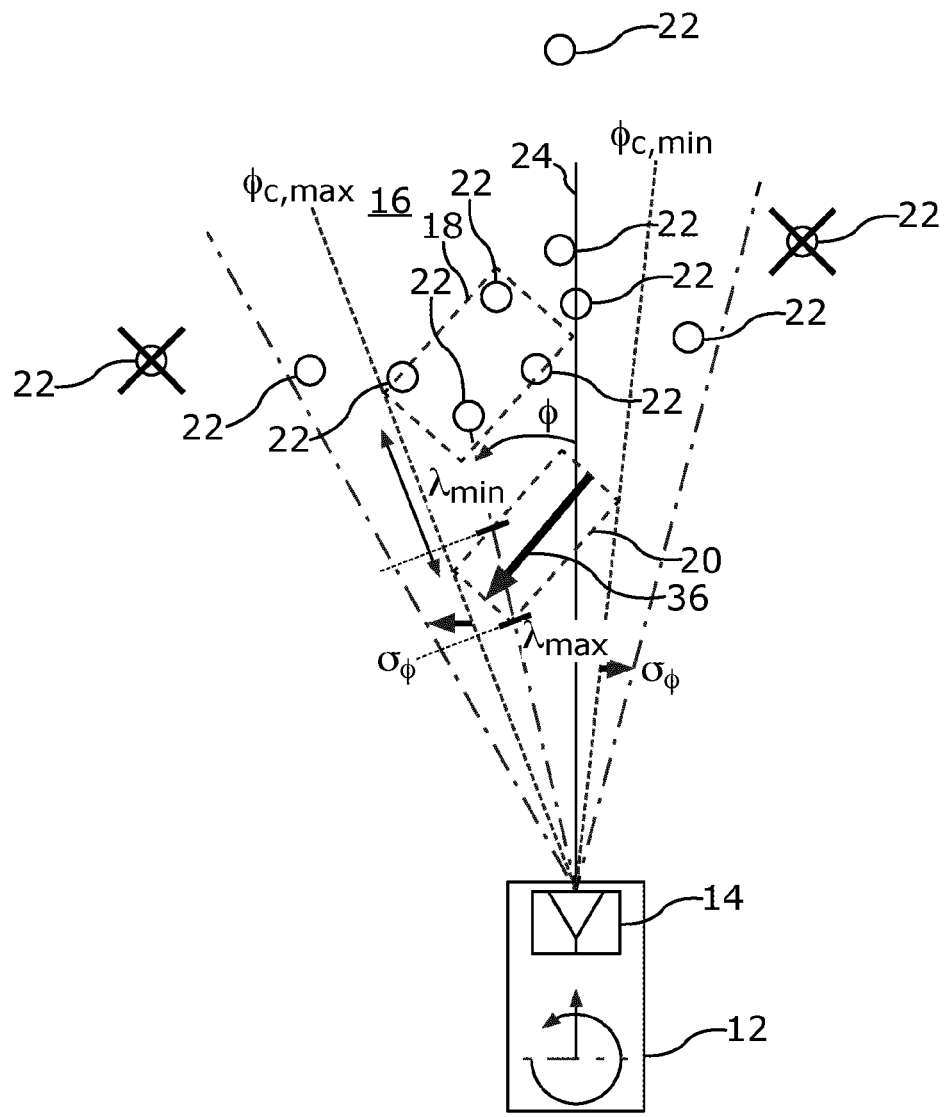
FIG. 4 shows a schematic overview illustration to illustrate details of the method.

The method is executed here by a motor vehicle 12 illustrated as part of a schematic overview illustration shown in FIG. 4. For this purpose, the motor vehicle 12 has an assistance system 14, which on its part in turn comprises a camera and a radar unit for acquiring or imaging the surroundings 16 of the motor vehicle 12. The camera and the radar unit can also be arranged at different points of the motor vehicle 12, thus spatially distributed or spaced apart from one another. In any case, however, a respective position and orientation of the camera and the radar unit in the motor vehicle 12 or relative to the motor vehicle 12 is predefined or known, in particular fixedly. Different coordinate systems can thus be used for the camera and the radar unit or respective sensor or measurement data recorded thereby, between which a conversion or transformation is possible in a known manner based on the specification, however.

An object 18 is located in the surroundings 16 in the present case at an initially unknown point. Moreover, further moving and/or unmoving objects, which are not characterized in greater detail here, can be located in the surroundings 16. In a method step S1, camera data of the surroundings 16 are recorded by means of the camera. Imaged objects are automatically recognized and marked therein or in one or more corresponding camera images. In the present case, for example, the object 18 was recognized as a vehicle and a delimiting frame 20 was generated for this object 18, which encloses the recognized object 18 in the camera data. Moreover, further properties of the object 18 can be determined or estimated on the basis of the camera data, for example, its type or class, size or extension, orientation, and/or more of the like. Predefined assumptions or further data, which can be obtained, for example, from another assistance system of the motor vehicle 12, can possibly be taken into consideration here.

In method step S2, which can be executed at least essentially chronologically in parallel thereto, for example, the surroundings 16 is scanned or sampled by means of the radar unit. A large number of radar echoes 22 are received from the surroundings 16. An associated Doppler velocity $v_D$, an associated distance, an associated azimuth angle $\Phi$, for example in relation to a travel direction 24 of the motor vehicle 12, and/or further data or properties can be determined automatically for these radar echoes 22. The radar echoes 22 or the corresponding radar data—like the camera data recorded in method step S1—can also be provided with a timestamp, which indicates a respective recording time.

If, after the recording of the radar data, no camera data having the same timestamp are present, in a method step S3, available camera data can be interpolated or extrapolated on a point in time indicated by the timestamp of the radar data. The delimiting frame 20 can be shifted accordingly here, for example.

In a method step S4, if this has not yet taken place, a Doppler compensation can be carried out. The Doppler velocity $v_D$ for the radar echoes 22 can be determined on the basis of the radar data and a retrieved current velocity of the motor vehicle 12. The Doppler velocity $v_D$ indicates the velocity component in the radial direction, thus toward the motor vehicle 12 or away from the motor vehicle 12, of a surroundings object which has generated the respective radar echo 22. For illustration, one of the radar echoes 22 is additionally identified here as a radar echo 26, wherein a radius line which connects a position of the radar echo 26 in a radial direction to the motor vehicle 12 is shown. The Doppler velocity $v_D$ of the radar echo 26 is that velocity component of a surroundings object causing the radar echo 26, which is directed in a world-fixed coordinate system along this radius line. Based on the Doppler velocities $v_D$, the radar echoes 22 can then be filtered to sort out those having Doppler velocity $v_D$ which is negligible or lies below a predefined threshold value.

In a method step S5, the radar echoes 22 can be transformed or projected in a coordinate system of the camera data or the radar echoes 22 and the camera data can be transformed or projected in a common or predefined coordinate system. This can be in particular a plane traveled by the motor vehicle 12. This is illustrated in FIG. 4.

Therein, an azimuth angle range $\Phi_{c,min}$-$\Phi_{c,max}$ is covered by the delimiting frame 20 from the viewpoint of the motor vehicle 12. To take into consideration an uncertainty op in the determination of the azimuth angle $\Phi$ of the radar echoes 22, the azimuth angle range can be expanded on both sides by the uncertainty $\sigma_\Phi$ in each case, so that ultimately the range from $\Phi_{c,min}+\sigma_\Phi$ to $\Phi_{c,max}-\sigma_\Phi$ is considered to be the azimuth angle range. Furthermore, a scaling error $\lambda$ is determined for the remaining, thus moving radar echoes 22, which indicates the distance of the respective radar echo 22 in the radial direction to the delimiting frame 20. An average scaling error $\lambda$ or, for example, a respective minimum scaling error $\lambda_{min}$ and a respective maximum scaling error $\lambda_{max}$ can be determined in each case here.

In a method step S6, further filtering of the radar echoes 22 takes place based on the azimuth angle $\Phi$ and the scaling error $\lambda$. For example, radar echoes 22 identified by a cross here, which are located outside the expanded azimuth angle range, are filtered out and furthermore only those radar echoes 22 are taken into consideration which are located inside the expanded azimuth angle range and the scaling error of which falls in a predefined interval.

Figure 5:
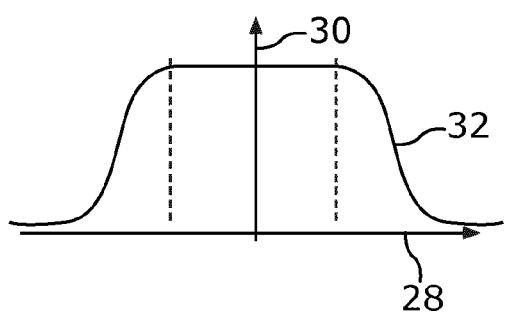
FIG. 5 shows a schematic illustration to illustrate a probability function usable in the method.

In addition, a respective probability for the scaling error $\lambda$ and an error of the azimuth angle $\Phi$ can be determined for the radar echoes 22. For this purpose, FIG. 5 schematically shows a coordinate system, on the abscissa 28 of which, for example, the scaling error $\lambda$ or the error of the azimuth angle $\Phi$ can be plotted and on the ordinate 30 of which a corresponding probability value is plotted. An exemplary predefined probability function 32 is shown therein. Respective values centered around a predefined absolute value can be assigned a constant probability according to the probability function 32, while greater or smaller values can be assigned an accordingly lower probability.

If at least three radar echoes 22 remain after the filtering in method step S6, the method can be continued with a method step S7. The hypothesis can be checked here that the remaining radar echoes 22 originate from an extended object. If this hypothesis is successful, the method can be continued in a method step S10. If the hypothesis fails, thus is not successful, the method can be continued in a method step S8. For illustration, FIG. 2 shows for this purpose an exemplary schematic first detail flow chart 34. In method step S7.1, the radar echoes 22 remaining after the filtering are provided as input data. In method step S7.2, two candidates are selected randomly therefrom. In method step S7.3, a Doppler velocity profile and an estimated orientation of the hypothetical surroundings object and a deviation of this estimated orientation from the camera-based determined object orientation 36 assigned to the delimiting frame 20 are ascertained for these selected candidates.

Figure 6:
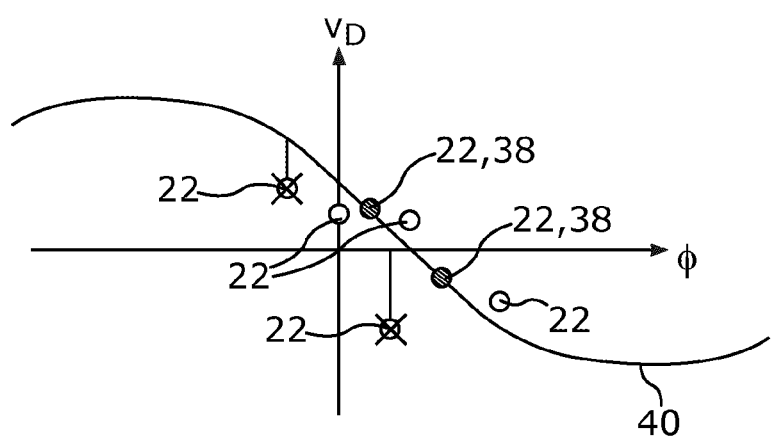
FIG. 6 shows a schematic illustration to illustrate a Doppler velocity profile usable in the method.

FIG. 6 schematically shows for this purpose a coordinate system, the x axis of which represents the azimuth angle $\Phi$ and the y axis of which represents the Doppler velocity $v_D$ of the radar echo 22. For two candidate echoes 38 selected by way of example here, an expected cosine curve 40 is shown, which corresponds to a Doppler velocity profile expected according to the hypothesis for the two candidate echoes 38. A set of radar echoes 22 is determined here, which are consistent with this Doppler velocity profile. Two radar echoes 22 marked here by crosses have an excessive deviation from the cosine curve 40 and are therefore classified as inconsistent with the Doppler velocity profile and accordingly are not incorporated in the set of consistent radar echoes 22.

In method step S7.4, a corresponding comparison is carried out based on the scaling errors 2 and the errors of the azimuth angle $\Phi$ to also determine the respective set of consistent radar echoes 22 with respect to these criteria.

If a corresponding set of radar echoes 22 has already been determined, in method step S7.5, a comparison of these sets of radar echoes 22 is carried out to select the best set. The best set in this meaning can be, for example, that set of radar echoes 22 which best confirms the hypothesis, for example, has the highest probabilities or the greatest number of consistent radar echoes 22. As indicated here by a corresponding loop path, it is possible to pass through method steps S7.2 to S7.5 multiple times iteratively.

In method step S7.6, a velocity of the underlying surroundings object and its orientation can be estimated based on the selected best set of radar echoes 22. If the selected set of consistent radar echoes 22 contains sufficiently many radar echoes 22 and the orientation and/or velocity determined based thereon is plausible, for example, in comparison to the camera data or the delimiting frame 20, in method step S7.7, the corresponding hypothesis is classified or assessed as successful. Otherwise, the hypothesis is classified as unsuccessful or failed and the method is continued with method step S8. The hypothesis can be checked therein that the radar echoes 22 originate from a yawing, thus rotating object. In method step S8, for this purpose, the estimated velocity and an estimated yaw rate is assessed or checked for its plausibility under this hypothesis or corresponding predefined associated conditions or criteria. If it is shown that corresponding data or values or results is successful, thus plausible, with the hypothesis that the radar echoes 22 originate from a yawing object, the estimated velocity and the estimated yaw rate are thus in a range plausible for a yawing object, the method is also continued in method step S10. Otherwise, the method is continued with a method step S9. Method step S9 is also executed if fewer than three radar echoes 22 remain after the filtering in method step S6.

A single echo approach is run through in method step S9. A schematic second detail flow chart 42 is shown by way of example in FIG. 3 to explain this single echo approach. In a method step S9.1 therein, the radar echoes 22 are provided as input data. In method step S9.2, a probability for the affiliation or assignment of the respective radar echo 22 with the hypothetical object is determined based on the Doppler velocity $v_D$. In method step S9.3, the probability is determined for the respective radar echo 22 based on the scaling error $\lambda$. In method step S9.4, the probability is determined for the respective radar echo 22 based on the azimuth angle Φ. If multiple radar echoes 22 were provided as input data, this can be carried out for each or a random selection of the radar echoes 22. A corresponding predefined probability function 32 can be used in each case here.

In a method step S9.5, the radar echo 22 having the highest probability is selected. It can then be checked whether this probability meets a predefined threshold value. If this is not the case, the corresponding hypothesis, thus that the respective radar echo 22 is associated with the object 18 represented by the delimiting frame 20, can be discarded, thus classified as failed or unsuccessful. In this case, the method can be ended or continued with the next delimiting frame 20, for which the method can be run through again from method step S6, for example. An object detection of the object 18 can also be output solely based on the camera data, possibly provided with a correspondingly reduced detection probability or weighting.

In contrast, if the probability of the best radar echo 22 selected in method step S9.5 is greater than the probability threshold value, in a method step S9.7, radar echoes 22 similar to this radar echo 22 can thus be identified according to one or more predefined criteria, to possibly also form a set of radar echoes 22 in this case which can be assigned to the delimiting frame 20 or the object 18. Independently of whether such similar radar echoes 22 could be identified, the corresponding hypothesis is classified as successful in method step S9.8.

The radar echoes 22 successfully assigned to the delimiting frame 20 or the object 18 according to method steps S7, S8, or S9 are then used in method step S10 in order to correct the distance of the delimiting frame 20 to the motor vehicle 12, which up to this point has only been estimated, based on the radar-based determined distances. The delimiting frame 20 can be shifted, for example, in the radial direction by the scaling error $\lambda$ of the successfully assigned radar echoes 22, in FIG. 4, for example, thus to the position of the object 18 marked by dashed lines.

In method step S11, a corresponding measurement or a corresponding object detection or an object data set indicating a corresponding successful object detection is generated for the object 18 thus detected. This object data set can comprise the delimiting frame 20 having the corrected distance, the successfully assigned, thus associated radar echoes 22, and possibly further variables or data determined in the course of the method.

In possibly optional or application-dependent method step S12, on the basis of this object data set or the successful detection of the object 18, for example, a tracking of the object 18 can then be carried out or updated, the detection or the object 18 can be entered in a dynamic map grid or raster, the motor vehicle 12 can be controlled, and/or more of the like. In particular, the radar detections indicated in the object data set can be marked as actually originating from a real surroundings object and accordingly used for other data processing having correspondingly higher level of confidence, since it can be presumed that they are not clutter echoes, for example.

In summary, it is thus proposed here that bounding boxes having an orientation and size be determined directly in each individual measurement cycle based on the camera data and raw Doppler detections of a radar be assigned to these bounding boxes. Such an assignment is not trivial, for example, due to clutter echoes and multipath propagations of the radar radiation and a possibly high object density, for example, in an urban space or in a congestion situation. The proposed method first attempts to implement an association with an extended camera object via the combination of Doppler detections which have a consistent Doppler profile. The association can be assessed here on the basis of the Doppler profile and an orientation estimation resulting therefrom. Moreover, the scaling error $\lambda$ in the camera-based determined distance of the respective bounding box can be corrected or checked for plausibility by the radar-based determined distance. As a result, a direct association of raw Doppler detections, thus corresponding raw radar data, with a camera-based recognized object and a correspondingly corrected object detection can be obtained. Not only surroundings objects located ahead or moving toward the motor vehicle 12 in the radial direction can be detected here, but rather, for example, also surroundings objects entering laterally, thus at least essentially perpendicularly to the travel direction 24 into the surroundings 16 or an acquisition range of the assistance system 14 can be recognized or extracted or detected particularly rapidly on the basis of a plausibility check on the basis of the Doppler profile. In the method, a grouping and association of radar detections with a surroundings object can advantageously be used for a particularly robust update of a tracking of surroundings objects over time (track update).

Overall, the described examples therefore show how a radar-camera association can be implemented based on Doppler detections and bounding boxes to enable improved detection in particular of moving objects in the surroundings of a vehicle.

LIST OF REFERENCE SIGNS 10 flow chart
12 motor vehicle
14 assistance system
16 surroundings
18 object
20 delimiting frame
22 radar echoes
24 travel direction
26 radar echo
28 abscissa
30 ordinate
32 probability function
34 first detail flow chart
36 object orientation
38 candidate echoes
40 cosine curve
42 second detail flow chart
S1-S12 method steps
Φ azimuth angle
$\Phi_{c,min}$-$\Phi_{c,max}$ azimuth angle range
$\lambda$ scaling error
$\lambda_{min}$ minimum scaling error
$\lambda_{max}$ maximum scaling error
$\sigma_\Phi$ uncertainty
$v_D$ Doppler velocity

The invention claimed is:
1. A method for detecting objects from a motor vehicle that move in surroundings of the motor vehicle, the method comprising:
recording camera data of the surroundings;
recording radar echoes from the surroundings;
recognizing at least one object depicted in the camera data on a basis of the camera data;
generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes; and outputting the delimiting frame with the respective corrected distance as an object data set indicating successful object detection, wherein carrying out the assignment between the at least one of the moving radar echoes and the delimiting frame comprises carrying out the assignment between at least three moving radar echoes and the delimiting frame;

wherein the method further comprises:
  determining a Doppler velocity profile on a basis of the at least three moving radar echoes such that as many as possible of the radar echoes are consistent with the Doppler velocity profile; and
  correcting the distance of the respective delimiting frame based on the determined distances of only the radar echoes consistent with the Doppler velocity profile.

2. The method according to claim 1, further comprising:
carrying out the method for radar echoes of one measurement cycle in each case;

determining that no camera data recorded simultaneously is available for a recording time of the measurement cycle; and interpolating or extrapolating available camera data onto the recording time of the measurement cycle in response to determining that no camera data recorded simultaneously is available for the recording time of the measurement cycle.

3. The method according to claim 1, wherein
the radar echoes and the delimiting frame are embedded in a predefined coordinate system,
the method further comprising:
determining a scaling error in the predefined coordinate system at least for the moving radar echoes, which scaling error indicates a distance of the respective radar echo to the delimiting frame in a radial direction with respect to the current position of the motor vehicle; and
determining that the scaling error for the respective radar echo is less than a predefined threshold value for a successful assignment.

4. The method according to claim 1, further comprising:
assessing the assignment based on a predefined probability function for the azimuth angle and/or for a scaling error which indicates for a radar echo in each case its distance to the respective delimiting frame in a predefined coordinate system, wherein the predefined probability function has a constant central range from which the probability drops toward both sides.

5. The method according to claim 1, further comprising:
estimating an orientation of the at least one object on a basis of the radar echoes;
comparing the estimated orientation to an orientation of the respective delimiting frame; and
assessing the assignment on a basis of a deviation between the orientation of the at least one object and the orientation of the respective delimiting frame, wherein the assignment is retained in response to the deviation being less than a predefined threshold value.

6. The method according to claim 1, further comprising:
determining an orientation of the respective delimiting frame;
estimating a radar-based orientation and movement velocity of the at least one object in a direction of the radar-based determined orientation on a basis of the radar echoes consistent with the Doppler velocity profile; and
checking whether the corresponding respective data are consistent with a yawing object using a predefined velocity-dependent yaw rate and/or a predefined velocity as a plausible reference, in the event of a deviation of the orientations from one another lying above a predefined threshold value.

7. The method according to claim 1, further comprising:
determining a scaling error for the radar echoes, which indicates a distance of the respective radar echo to the respective delimiting frame in a radial direction with respect to the current position of the motor vehicle;
upon successful assignment of a plurality of consistently moving radar echoes to a delimiting frame, analysing stationary radar echoes detected in a predefined spatial vicinity to these radar echoes, which have a negligible Doppler velocity; and
assigning analysed stationary radar echoes to the respective delimiting frame that are also consistent with the Doppler velocity profile and the scaling error of which deviates by at most a predefined absolute value from the scaling errors of the moving radar echoes already assigned to the respective delimiting frame.

8. The method according to claim 1, further comprising:
determining that fewer than three moving radar echoes have been assigned to the delimiting frame, or that such an assignment has resulted in an error;
determining an orientation of the delimiting frame;
estimating a plausible Doppler velocity of the at least one object in relation to the current position of the motor vehicle based on the orientation of the delimiting frame;
for each moving radar echo of the moving radar echoes having been assigned to the delimiting frame, determining a probability that one moving radar echo of the fewer than three moving radar echoes having been assigned to the delimiting frame originates from the at least one object enclosed by the respective delimiting frame by comparing the estimated Doppler velocity to the radar-based determined Doppler velocity for the one moving radar echo; and
using, as the basis for correcting the assumed distance of the delimiting frame, only or at least the radar echo for which the highest probability was determined.

9. The method according to claim 1, further comprising:
automatically classifying objects recognized on a basis of the camera data with respect to their type based on predefined classes, wherein plausible radar-based determined Doppler velocity directions are assigned to each class, and the assignment of a radar echo to a delimiting frame is precluded in response to a Doppler velocity direction determined for the respective radar echo being different from the plausible Doppler velocity directions for the type of the object enclosed by the respective delimiting frame.

10. The method according to claim 1, further comprising:
automatically classifying objects recognized on a basis of the camera data with respect to their type based on predefined classes, wherein a plausible Doppler velocity range is assigned to each class, and the assignment of a radar echo to a delimiting frame is precluded in response to the Doppler velocity determined for the respective radar echo being outside the plausible Doppler velocity range for the type of the object enclosed by the respective delimiting frame.

11. The method according to claim 1, further comprising:
determining a respective radar cross section at least for the moving radar echoes;
automatically classifying objects recognized on the basis of the camera data with respect to their type based on predefined classes, wherein a plausible radar cross section range is assigned to each class; and
precluding the assignment of a radar echo to a delimiting frame in response to the radar cross section of the respective radar echo being outside the plausible radar cross section range for the type of the object enclosed by the respective delimiting frame.

12. A motor vehicle, comprising:
a surroundings sensor system having at least one camera for recording camera data of the surroundings of the motor vehicle and at least one radar unit for emitting radar pulses into the surroundings and recording resulting radar echoes from the surroundings; and
a data processing unit connected to the surroundings sensor system, wherein the data processing unit is configured to:
recognize at least one object depicted in the camera data on a basis of the camera data;
generate an azimuth angle range occupied by the at least one object from a viewpoint of the motor vehicle and a delimiting frame enclosing the at least one object having an assumed distance to the motor vehicle for the at least one object;
determine an associated Doppler velocity for the radar echoes with respect to a current position of the motor vehicle;
determine an associated distance from the motor vehicle and an associated azimuth angle at least for moving radar echoes for which a non-negligible Doppler velocity is determined;
carry out an assignment between at least one of the moving radar echoes and the delimiting frame by comparing the respective azimuth angle to the azimuth angle range and by comparing the respective radar-based determined distance to the camera-based assumed distance;
for the delimiting frame to which the at least one of the moving radar echoes was successfully assigned, correct the respective assumed distance according to the radar-based determined distance of the at least one of the moving radar echoes; and
output the delimiting frame with the respective corrected distance as an object data set indicating successful object detection;

wherein the data processing unit is further configured to:
carry out the assignment between the at least one of the moving radar echoes and the delimiting frame by carrying out the assignment between at least three moving radar echoes and the delimiting frame;
determine a Doppler velocity profile on a basis of the at least three moving radar echoes such that as many as possible of the radar echoes are consistent with the Doppler velocity profile; and
correct the distance of the respective delimiting frame based on the determined distances of only the radar echoes consistent with the Doppler velocity profile.

13. A method for detecting objects from a motor vehicle that move in surroundings of the motor vehicle, the method comprising:
recording camera data of the surroundings;
recording radar echoes from the surroundings;
recognizing at least one object depicted in the camera data on a basis of the camera data;
generating an azimuth angle range occupied by the at least one object from a viewpoint of the motor vehicle and a delimiting frame enclosing the at least one object having an assumed distance to the motor vehicle for the at least one object;
determining an associated Doppler velocity for the radar echoes with respect to a current position of the motor vehicle;
determining an associated distance from the motor vehicle and an associated azimuth angle at least for moving radar echoes for which a non-negligible Doppler velocity is determined;
carrying out an assignment between at least one of the moving radar echoes and the delimiting frame by comparing the respective azimuth angle to the azimuth angle range and by comparing the respective radar-based determined distance to the camera-based assumed distance;
for the delimiting frame to which the at least one of the moving radar echoes was successfully assigned, correcting the respective assumed distance according to the radar-based determined distance of the at least one of the moving radar echoes;
outputting the delimiting frame with the respective corrected distance as an object data set indicating successful object detection,
wherein the radar echoes and the delimiting frame are embedded in a predefined coordinate system,
the method further comprising:
determining a scaling error in the predefined coordinate system at least for the moving radar echoes, which scaling error indicates a distance of the respective radar echo to the delimiting frame in a radial direction with respect to the current position of the motor vehicle; and
determining that the scaling error for the respective radar echo is less than a predefined threshold value for a successful assignment.

14. A method for detecting objects from a motor vehicle that move in surroundings of the motor vehicle, the method comprising:
recording camera data of the surroundings;
recording radar echoes from the surroundings;
recognizing at least one object depicted in the camera data on a basis of the camera data;
generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes;

outputting the delimiting frame with the respective corrected distance as an object data set indicating successful object detection; and assessing the assignment based on a predefined probability function for the azimuth angle and/or for a scaling error which indicates for a radar echo in each case its distance to the respective delimiting frame in a predefined coordinate system, wherein the predefined probability function has a constant central range from which the probability drops toward both sides.

15. A method for detecting objects from a motor vehicle that move in surroundings of the motor vehicle, the method comprising:

recording camera data of the surroundings;

recording radar echoes from the surroundings;

recognizing at least one object depicted in the camera data on a basis of the camera data;

generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes;

outputting the delimiting frame with the respective corrected distance as an object data set indicating successful object detection;

determining that fewer than three moving radar echoes have been assigned to the delimiting frame, or that such an assignment has resulted in an error;

determining an orientation of the delimiting frame;

estimating a plausible Doppler velocity of the at least one object in relation to the current position of the motor vehicle based on the orientation of the delimiting frame;

for each moving radar echo of the moving radar echoes having been assigned to the delimiting frame, determining a probability that one moving radar echo of the fewer than three moving radar echoes having been assigned to the delimiting frame originates from the at least one object enclosed by the respective delimiting frame by comparing the estimated Doppler velocity to the radar-based determined Doppler velocity for the one moving radar echo; and using, as the basis for correcting the assumed distance of the delimiting frame, only or at least the radar echo for which the highest probability was determined.

16. A method for detecting objects from a motor vehicle that move in surroundings of the motor vehicle, the method comprising:

recording camera data of the surroundings;

recording radar echoes from the surroundings;

recognizing at least one object depicted in the camera data on a basis of the camera data;

generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes;

outputting the delimiting frame with the respective corrected distance as an object data set indicating successful object detection; and automatically classifying objects recognized on a basis of the camera data with respect to their type based on predefined classes, wherein plausible radar-based determined Doppler velocity directions are assigned to each class, and the assignment of a radar echo to a delimiting frame is precluded in response to a Doppler velocity direction determined for the respective radar echo being different from the plausible Doppler velocity directions for the type of the object enclosed by the respective delimiting frame.

17. A method for detecting objects from a motor vehicle that move in surroundings of the motor vehicle, the method comprising:

recording camera data of the surroundings;

recording radar echoes from the surroundings;

recognizing at least one object depicted in the camera data on a basis of the camera data;

generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes;

outputting the delimiting frame with the respective corrected distance as an object data set indicating successful object detection; and automatically classifying objects recognized on a basis of the camera data with respect to their type based on predefined classes, wherein a plausible Doppler velocity range is assigned to each class, and the assignment of a radar echo to a delimiting frame is precluded in response to the Doppler velocity determined for the respective radar echo being outside the plausible Doppler velocity range for the type of the object enclosed by the respective delimiting frame.

18. A method for detecting objects from a motor vehicle that move in surroundings of the motor vehicle, the method comprising:

recording camera data of the surroundings;

recording radar echoes from the surroundings;

recognizing at least one object depicted in the camera data on a basis of the camera data;

generating an azimuth angle range occupied by the at least one object from a viewpoint of the motor vehicle and a delimiting frame enclosing the at least one object having an assumed distance to the motor vehicle for the at least one object;

determining an associated Doppler velocity for the radar echoes with respect to a current position of the motor vehicle;

determining an associated distance from the motor vehicle and an associated azimuth angle at least for moving radar echoes for which a non-negligible Doppler velocity is determined;

carrying out an assignment between at least one of the moving radar echoes and the delimiting frame by comparing the respective azimuth angle to the azimuth angle range and by comparing the respective radar-based determined distance to the camera-based assumed distance;

for the delimiting frame to which the at least one of the moving radar echoes was successfully assigned, correcting the respective assumed distance according to the radar-based determined distance of the at least one of the moving radar echoes;

outputting the delimiting frame with the respective corrected distance as an object data set indicating successful object detection;

determining a respective radar cross section at least for the moving radar echoes;

automatically classifying objects recognized on the basis of the camera data with respect to their type based on predefined classes, wherein a plausible radar cross section range is assigned to each class; and precluding the assignment of a radar echo to a delimiting frame in response to the radar cross section of the respective radar echo being outside the plausible radar cross section range for the type of the object enclosed by the respective delimiting frame.

* * * * *